United States Patent
Cui et al.

(10) Patent No.: US 11,257,523 B2
(45) Date of Patent: Feb. 22, 2022

(54) VIDEO PRODUCTION METHOD, COMPUTER DEVICE, AND STORAGE MEDIUM

(71) Applicant: Tencent Technology (Shenzhen) Company Limited, Shenzhen (CN)

(72) Inventors: Ling Rui Cui, Shenzhen (CN); Hao Zhang, Shenzhen (CN); Yi Ting Zhou, Shenzhen (CN); Nan Liu, Shenzhen (CN); Fengkai Wu, Shenzhen (CN); Hui Fu Jiang, Shenzhen (CN); Sheng Fei Xia, Shenzhen (CN); Rong Li, Shenzhen (CN); Xin Wan Wu, Shenzhen (CN); Xu Bin Lu, Shenzhen (CN); Yi Fan Guo, Shenzhen (CN); Ran Zhang, Shenzhen (CN); Jinqian Li, Shenzhen (CN); Yi Xu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/910,788

(22) Filed: Jun. 24, 2020

(65) Prior Publication Data
US 2020/0321029 A1    Oct. 8, 2020

Related U.S. Application Data

(63) Continuation of application No. PCT/CN2019/080158, filed on Mar. 28, 2019.

(30) Foreign Application Priority Data

Apr. 28, 2018 (CN) .......................... 201810404933.5

(51) Int. Cl.
| | |
|---|---|
| *G11B 27/031* | (2006.01) |
| *G11B 27/00* | (2006.01) |

(Continued)

(52) U.S. Cl.
CPC .......... *G11B 27/031* (2013.01); *G11B 27/005* (2013.01); *H04N 5/76* (2013.01);
(Continued)

(58) Field of Classification Search
None
See application file for complete search history.

(56) References Cited

U.S. PATENT DOCUMENTS

| | | | |
|---|---|---|---|
| 2004/0004665 A1* | 1/2004 | Kashiwa | G11B 27/034 348/239 |
| 2007/0296822 A1 | 12/2007 | Lan et al. | |

(Continued)

FOREIGN PATENT DOCUMENTS

| | | | |
|---|---|---|---|
| CN | 105872698 A | 8/2016 | |
| CN | 105898133 A * | 8/2016 | ............. H04N 5/232 |

(Continued)

OTHER PUBLICATIONS

Extended European Search Report for Application No. 19792554.8 dated Jan. 19, 2021 (10 pages).

(Continued)

*Primary Examiner* — Heather R Jones
(74) *Attorney, Agent, or Firm* — Crowell & Moring LLC

(57) ABSTRACT

A video production method and apparatus, a storage medium, and a computer device are disclosed. The method includes: receiving a follow-shot instruction in a case that reference video content is played on a video play interface, the follow-shot instruction including a reference video identifier; displaying a first video display region and a second video display region on a terminal screen; playing the reference video content in the first video display region, and recording displayed real-time video content in the second video display region; and generating a target video based on the recorded real-time video content and the reference video (Continued)

content. The first video display region and the second video display region are displayed on the terminal screen, the reference video content is played in the first video display region, and the displayed real-time video content is recorded in the second video display region.

19 Claims, 8 Drawing Sheets

(51) Int. Cl.
  *H04N 5/76* (2006.01)
  *H04N 5/93* (2006.01)
  *H04N 21/431* (2011.01)
  *H04N 21/47* (2011.01)
(52) U.S. Cl.
  CPC ....... *H04N 5/9305* (2013.01); *H04N 21/4316* (2013.01); *H04N 21/47* (2013.01)

(56) References Cited

U.S. PATENT DOCUMENTS

2013/0272673 A1\* 10/2013 Swearingen ........... G11B 27/34
  386/224
2015/0037008 A1 2/2015 Iwamoto
2018/0098025 A1 4/2018 Woo et al.

FOREIGN PATENT DOCUMENTS

| CN | 105898133 A | 8/2016 |
| CN | 106354767 A | 1/2017 |
| CN | 206773587 U | 12/2017 |
| CN | 2018037859 A | 3/2018 |
| CN | 107948512 A | 4/2018 |
| CN | 108566519 A | 9/2018 |
| JP | 11-238359 A | 8/1999 |
| JP | 2015-31885 | 2/2015 |
| WO | WO2016/132267 A2 | 8/2016 |

OTHER PUBLICATIONS

Chinese Office Action for Chinese Patent Application 2018104049335 dated Mar. 1, 2021, including an English Concise Explanation (9 pages).
International Search Report and Written Opinion for PCT/CN2019/080158 dated Jun. 18, 2019 including translation of the International Search Report (13 pages).

\* cited by examiner

VIDEO PRODUCTION METHOD, COMPUTER DEVICE, AND STORAGE MEDIUM

RELATED APPLICATIONS

This application is a continuation of PCT Application No. PCT/CN2019/080158, filed on Mar. 28, 2019, which claims priority to Chinese patent application No. 2018104049335, filed with the China National Intellectual Property Administration on Apr. 28, 2018 entitled "VIDEO PRODUCTION METHOD AND APPARATUS, TERMINAL, AND STORAGE MEDIUM." The contents of PCT Application No. PCT/CN2019/080158 and Chinese patent application No. 2018104049335 are incorporated herein by reference in their entirety.

FIELD OF THE TECHNOLOGY

This application relates to the field of computer information technologies, and in particular, to a video production method, a computer device, and a storage medium.

BACKGROUND OF THE DISCLOSURE

With the development of information technologies, video communities for communication through videos are more widely applied. For ordinary users, reference and inspiration for shooting are mostly from scenes in videos being watched. For example, a user want to imitate a video of dance, painting, or the like.

In a traditional video production scheme, it is difficult for the users to produce videos. Taking dance imitation as an example, unless a user is proficient in learning all movements, the user needs to use two terminals respectively for watching and shooting, but may not be able to keep up with the movements. Therefore, the traditional video production scheme has a higher requirement on the users. Ordinary users mainly watch videos in the video communities and consume professionally generated content (PGC) and professional user generated content (PUGC), and the users tend to migrate to video communities with good content. As a result, the users in the video community that uses the traditional video production scheme have low stickiness.

SUMMARY

According to embodiments provided in this application, a video production method, a computer device, and a storage medium are provided.

A video production method is provided, including: receiving a follow-shot instruction in a case that reference video content is played on a video play interface, the follow-shot instruction including a reference video identifier; displaying a first video display region and a second video display region on a terminal screen, the first video display region being used for displaying the reference video content corresponding to the reference video identifier, and the second video display region being used for displaying real-time video content acquired by a terminal camera apparatus; playing the reference video content in the first video display region, and recording the displayed real-time video content in the second video display region; and generating a target video based on the recorded real-time video content and the reference video content.

A video production apparatus is provided, including:
a follow-shot instruction receiving module configured to receive a follow-shot instruction in a case that reference video content is played on a video play interface, the follow-shot instruction including a reference video identifier;
a video region display module configured to display a first video display region and a second video display region on a terminal screen, the first video display region being used for displaying the reference video content corresponding to the reference video identifier, and the second video display region being used for displaying real-time video content acquired by a terminal camera apparatus;
a video playing and recording module configured to play the reference video content in the first video display region, and record the displayed real-time video content in the second video display region; and a target video generating module configured to generate a target video based on the recorded real-time video content and the reference video content.

A computer device is provided, including a memory and a processor, the memory storing a computer program, the computer program, when executed by the processor, causing the processor to perform the steps of the foregoing method.

A non-transitory computer readable storage medium is provided, storing at least one instruction, at least one program, and a code set or an instruction set, the at least one instruction, the at least one program, and the code set or the instruction set being loaded and executed by a processor, causing the processor to perform the steps of the foregoing method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application or in the existing technology more clearly, the following briefly introduces the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and technical effects of this application clearer and more comprehensible, specific embodiments of this application are described in detail below with reference to the accompanying drawings. It is to be understood that the specific embodiments described herein are merely used to explain this application, and are not intended to limit this application.

Figure 1:
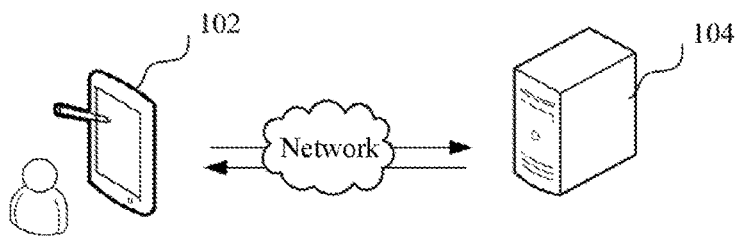
FIG. 1 is an application environment diagram of a video production method according to an embodiment.

A video production method provided in this application may be applied to an application environment shown in FIG. 1. A terminal 102 communicates with a server 104 through a network. The video production method in this application may run on the terminal 102. The terminal 102 sends a video request to the server 104, and the server 104 returns to-be-played video data to the terminal 102 according to the received video request. After recording a video, the terminal 102 may send the video to the server 104 for releasing, to obtain new video data that can be watched or shot by others. The terminal 102 may be, but not limited to, a personal computer, a notebook computer, a smartphone, a tablet computer, and a portable wearable device. The server 104 may be implemented by an independent server or a server cluster including a plurality of servers.

Figure 2:
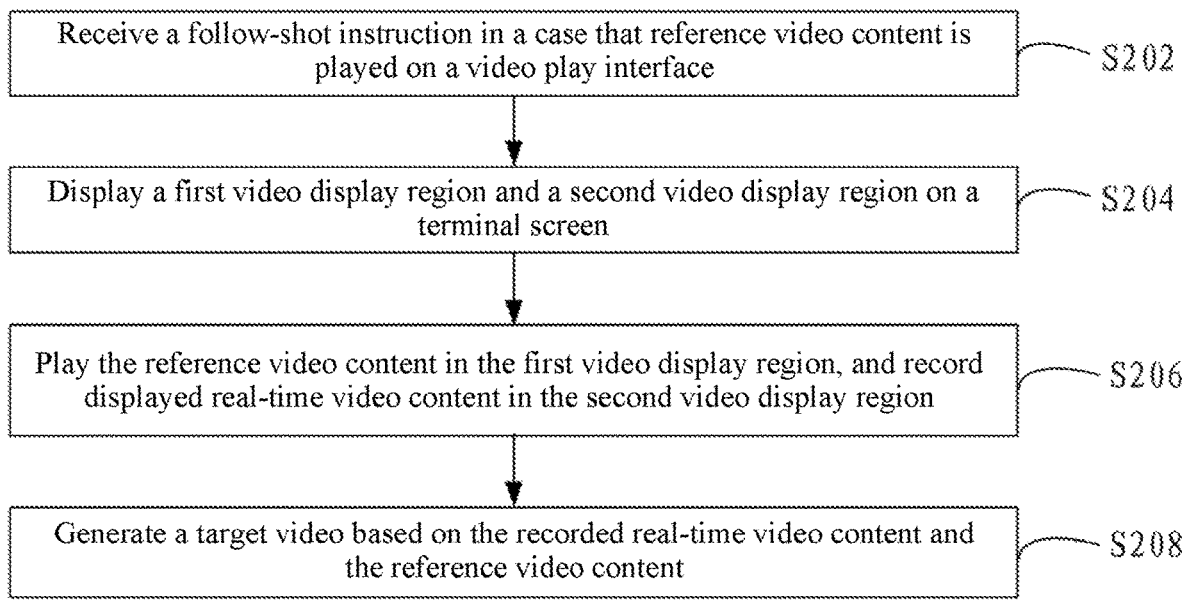
FIG. 2 is a schematic flowchart of a video production method according to an embodiment.

In an embodiment, as shown in FIG. 2, a video production method is provided. In this embodiment, for example, the method is mainly applied to the terminal in FIG. 1. Referring to FIG. 2, the video production method includes the following steps:

S202. Receive a follow-shot instruction in a case that reference video content is played on a video play interface.

When playing the reference video content on the video play interface, the terminal receives the follow-shot instruction inputted/indicated by a user. The video play interface is a play interface for playing video content before the terminal receives the follow-shot instruction. When the user wants to use video content being played as the reference video content, the follow-shot instruction is inputted/indicated to the terminal in a process of playing the video content, and the video content being played is the reference video content in this case. When the reference video content is played on the video play interface, the follow-shot instruction may be received by pressing a preset button on the receiving terminal in a preset manner, or by detecting that the terminal performs a preset action (such as shaking), or the follow-shot instruction may be received by receiving a preset operation on the video play interface. Generally, when watching a video, the user wants to perform shooting based on the video content being played (the reference video content). Therefore, the follow-shot instruction is received when the reference video content is played on the video play interface, thereby facilitating the user's operation and increasing user stickiness.

The follow-shot instruction includes a reference video identifier. The follow-shot instruction is used for instructing the terminal to play the reference video content corresponding to the reference video identifier when the terminal displays real-time video content collected by a terminal camera apparatus. The reference video identifier may be data such as a number and a name that can uniquely identify the reference video content.

S204. Display a first video display region and a second video display region on a terminal screen.

After receiving the follow-shot instruction, the terminal displays the first video display region and the second video display region on the screen, that is, a video follow-shot interface of the terminal includes the first video display region and the second video display region. The first video display region is used for displaying the reference video content corresponding to the reference video identifier, and the second video display region is used for displaying real-time video content collected by the terminal camera apparatus.

The terminal camera apparatus may be disposed on the same side as the terminal screen. For example, the terminal camera apparatus may be a front-facing camera or a rotating camera. Therefore, while the user watches content on the terminal screen, the terminal camera apparatus can collect the real-time video content of the user.

S206. Play the reference video content in the first video display region, and record displayed real-time video content in the second video display region.

After displaying the first video display region and the second video display region, the terminal plays the reference video content that the user wants to shoot in the first video display region, and records and displays the real-time video content of the user obtained by shooting in the second video display region. A play tool of the reference video content includes, but is not limited to, a player component of a system, a video player component provided by a third party, and the like. A method for transferring the reference video content to the first video display region includes but is not limited to: directly transferring the corresponding reference video content to the terminal for play according to the reference video identifier; and transferring the reference video identifier to the terminal according to the reference video identifier, and then downloading the corresponding reference video content from a server by the terminal according to the reference video identifier for play.

The terminal may start playing the reference video content when starting to record the displayed real-time video content, so that when recording a video, the user can perform based on the reference video content played in the first video display region. Further, the terminal may also start to play the reference video content before starting to record the real-time video content and after displaying the first video display region, so that the user can be familiar with the reference video content before starting the recording.

Still further, in the implementation in which the terminal starts to play the reference video content before starting to record the real-time video content and after displaying the first video display region, a number of times the terminal plays the reference video content may be a preset number of times, and the preset number may be any natural number such as 1 or 3. In a preferred embodiment, the preset number is a maximum threshold, so that the reference video content can be played in an infinite loop, and the user can be familiar with the reference video content recurrently before starting the recording.

S208. Generate a target video based on the recorded real-time video content and the reference video content.

When determining that a recording end condition is satisfied, the terminal generates the target video based on the recorded real-time video content and the reference video content. In particular, it may be determined that the recording ending condition is satisfied when the terminal receives a recording ending instruction, or it may be determined that the recording ending condition is satisfied after the terminal receives a recording starting instruction and when the reference video content is played.

According to the video production method, the follow-shot instruction is received in a case that the reference video content is played on the video play interface, the follow-shot instruction including the reference video identifier; the first video display region and the second video display region are displayed on the terminal screen, the first video display region being used for displaying the reference video content corresponding to the reference video identifier, and the second video display region being used for displaying the real-time video content acquired by the terminal camera apparatus; the reference video content is played in the first video display region, and the displayed real-time video content is recorded in the second video display region; and the target video is generated based on the recorded real-time video content and the reference video content. The first video display region and the second video display region are displayed on the terminal screen, the reference video content is played in the first video display region, and the displayed real-time video content is recorded in the second video display region, so that when a user records a video, the user can perform based on the reference video content, thereby reducing the recording difficulty for the user and increasing user stickiness.

In addition, generally, when watching a video, the user wants to perform shooting based on the video content being played (the reference video content). Therefore, the follow-shot instruction is received when the reference video content is played on the video play interface, thereby facilitating the user's operation and increasing user stickiness.

Figure 3:
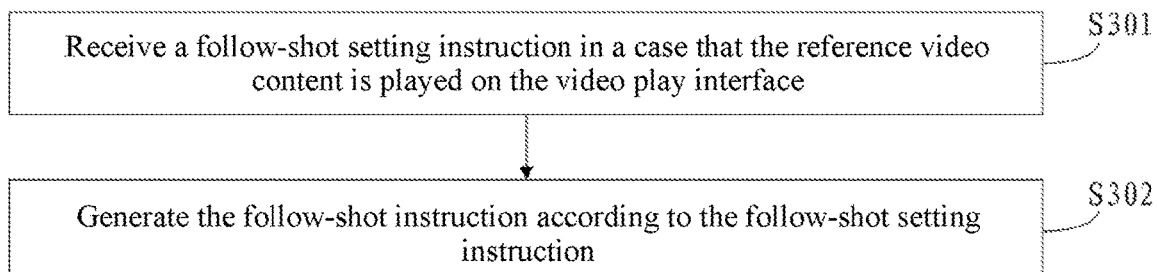
FIG. 3 is a schematic flowchart of a video production method according to another embodiment.

Further, as shown in FIG. 3, the operation of receiving a follow-shot instruction by a terminal in a case that reference video content is played on a video play interface includes:

S301. Receive a follow-shot setting instruction in a case that the reference video content is played on the video play interface. The follow-shot setting instruction includes at least one of a follow-shot starting point setting instruction and a follow-shot ending point setting instruction. The follow-shot starting point setting instruction carries follow-shot starting point information, and the follow-shot ending setting instruction carries follow-shot ending point information.

S302. Generate the follow-shot instruction according to the follow-shot setting instruction. The follow-shot instruction further includes at least one of the follow-shot starting point information and the follow-shot ending point information.

The follow-shot starting point information is information about a follow-shot starting point, and the follow-shot ending point information is information about a follow-shot ending point. The terminal may directly generate the follow-shot instruction after receiving the follow-shot starting point setting instruction and the follow-shot ending point setting instruction. That is, when the user sets the follow-shot starting point and the follow-shot ending point, the user directly performs the operation of displaying the first video display region and the second video display region on the terminal screen.

After receiving the follow-shot instruction, the terminal may receive the follow-shot setting instruction, and then add at least one of the follow-shot starting point information and the follow-shot ending point information to the follow-shot instruction. For example, after receiving the follow-shot instruction, the terminal enters a follow-shot starting point setting interface and a follow-shot ending point setting interface, receives the follow-shot starting point setting instruction and the follow-shot ending point setting instruction, and adds, to the follow-shot instruction, the follow-shot starting point information carried in the follow-shot starting point setting instruction and the follow-shot ending point information carried in the follow-shot ending point setting instruction, to generate a final follow-shot instruction.

When playing the reference video content, the user may press and hold a play region in the video play interface to pop up a function menu, select the follow-shot starting point setting instruction, and use a time point of playing the reference video content during pressing and holding as the follow-shot starting point, or may select the follow-shot ending point setting instruction, and use the time point of playing the reference video content during pressing and holding as the follow-shot ending point.

In some embodiments, the user may set only the play starting point, and a play ending point is an ending point of the reference video content in default. Further, during a recording process, the terminal may determine the play ending point by receiving the recording ending instruction. In some embodiments, the user may set only the play ending point, and a play starting point is a starting point of the reference video content in default.

Based on the video production method in this implementation, the user can set the play start point and playback end point of the reference video content, and further restrict the reference video content played in the first video display region, so that the user can perform based on a part of interest, thereby further increasing user stickiness.

In an embodiment, the follow-shot instruction may further include a music identifier.

The terminal may add the music identifier to the follow-shot instruction by receiving a music insertion instruction, so that music corresponding to the music identifier can be played when the real-time video content is recorded. In this way, diversity of the target video can be improved, thereby further increasing user stickiness.

Further, the follow-shot instruction may further include music offset information and music duration information. The terminal may add the music offset information and the music duration information to the follow-shot instruction by receiving the music insertion instruction, to instruct to play the music from a specified location (a location corresponding to the music offset information) and within a specified time range (which may be determined by the music offset information and the music duration information). It is to be understood that, in other embodiments, that is, in an embodiment in which the follow-shot instruction does not include the music offset information or the music duration information, the terminal starts playing the music from a starting location of the music corresponding to the music identifier, and plays the entire music by default.

Formats of the music may include moving picture experts group audio layer-3 (MP3), advanced audio coding (AAC), moving picture experts group audio layer-4 (MP4), a movie digital video technology (MOV), and the like.

In an embodiment, the operation of receiving a follow-shot instruction in a case that reference video content is played on a video play interface includes: receiving the follow-shot instruction by receiving a preset operation on the video play interface in a case that the reference video content is played on the video play interface.

The preset operation may be that the user touches a preset icon or a preset region on the video play interface of the terminal, or may be that the user draws a preset curve or shape on the video play interface of the terminal.

Based on the video production method in this implementation, the terminal receives the follow-shot instruction by receiving the preset operation on the video play interface, so that a reference relationship between the reference video identifier of the reference video content played on the video play interface and the target video is more directly established, thereby facilitating the user's operation and further increasing user stickiness.

Figure 4:
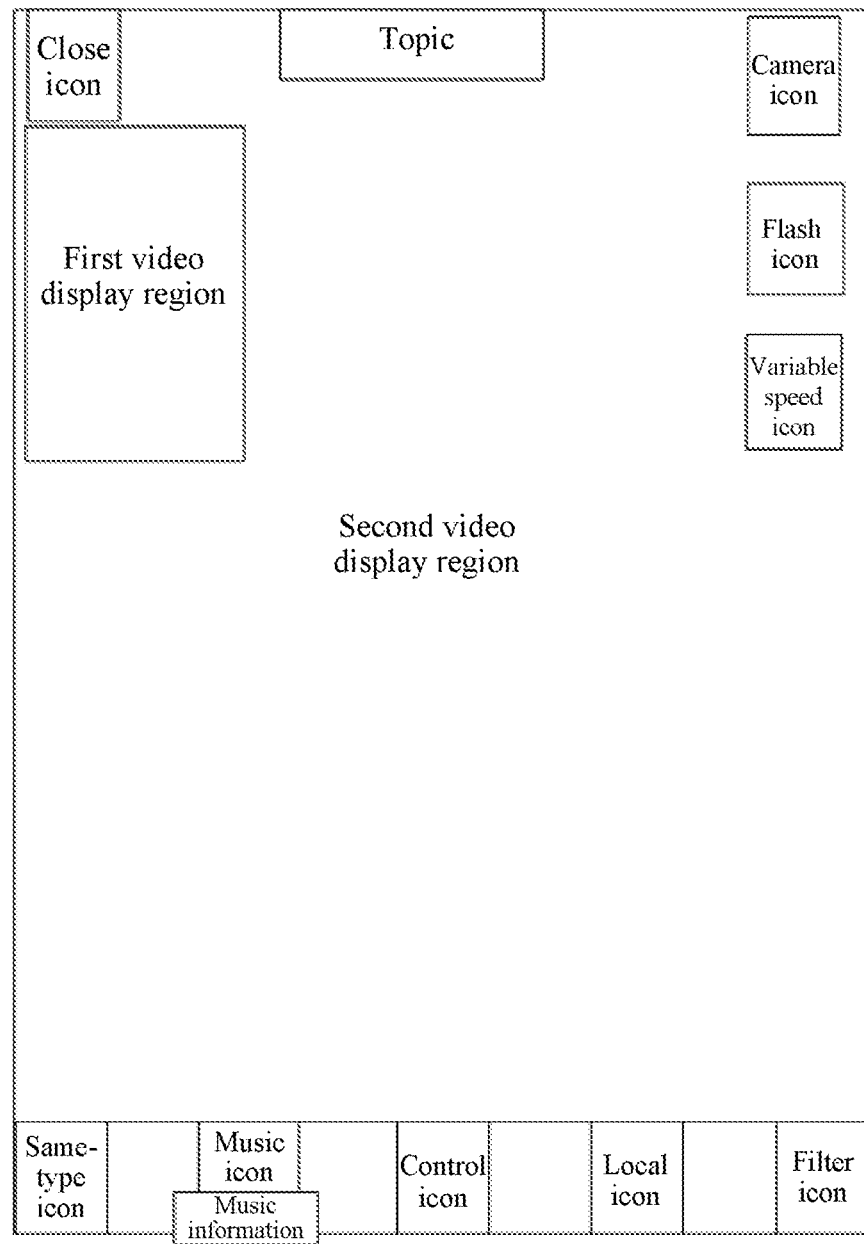
FIG. 4 is a schematic diagram of a video follow-shot interface according to an embodiment.

In an embodiment, as shown in FIG. 4, the first video display region is within a display range of the second video display region, and the first video display region is suspended on the second video display region. That is, an area of the first video display region is less than an area of the second video display region, and the first video display region is suspended on the second video display region. Therefore, it is convenient for the user to watch the reference video content played in a smaller display region, and the real-time video content is recorded in a larger display region, and the suspending manner can facilitate the user to move a location of the first video display region, thereby avoiding obscuring important screen content for the user. In this way, it is convenient for the user to record the real-time video content, thereby further increasing user stickiness.

Further, the first video display region may be located at an upper-left location, an upper-right location, a lower-left location, a lower-right location, or the like of the second video display region by default. The location of the first video display region may be further adjusted through an interface adjustment instruction. In this way, it is more convenient for the user to record videos, thereby further increasing user stickiness.

It is to be understood that, in other embodiments, location information of the first video display region and the second video display region may be adjusted. For example, the location information may also be: the second video display region is within a display range of the first video display region, and the second video display region is suspended on the first video display region. In addition, the location information may be alternatively: the first video display region and the second video display region are displayed on the terminal screen side by side or in parallel.

In an embodiment, an overlapping area of the first video display region and the second video display region does not exceed a preset threshold. The preset threshold may be any positive real number such as ⅒, 1/20 of an area of the terminal screen, or may be a value close to 0, or is 0. Therefore, the overlapping area of the first video display region and the second video display region is relatively small, thereby reducing mutual influence between the first video display region and the second video display region, and facilitating the user to watch the reference video content or the real-time video content. In a preferred embodiment, the preset threshold is a value close to 0, or is 0. Therefore, the overlapping area of the first video display region and the second video display region is close to 0 or is 0, thereby facilitating the user to watch the reference video content or the real-time video content.

Figure 5:
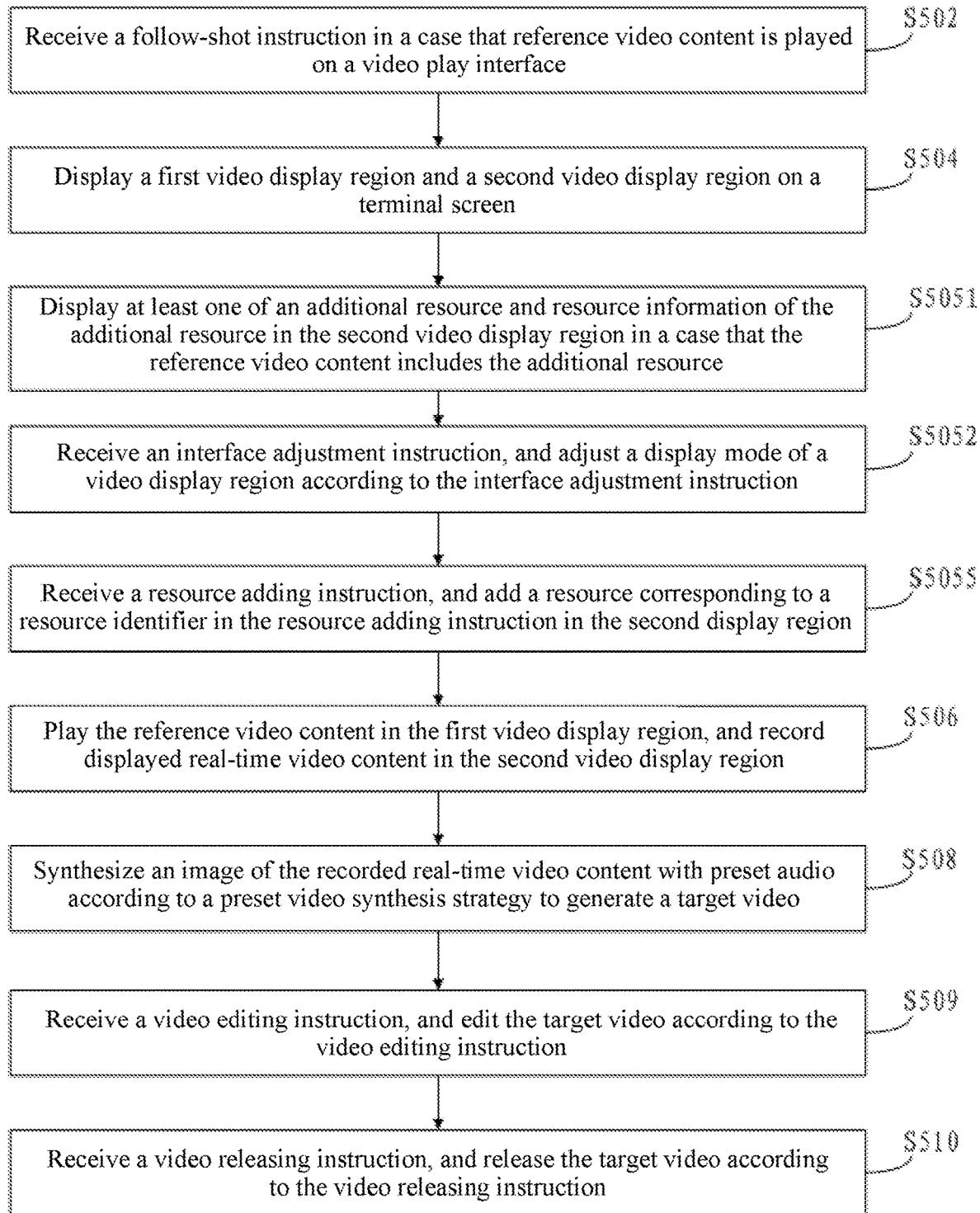
FIG. 5 is a schematic flowchart of a video production method according to still another embodiment.

As shown in FIG. 5, in an embodiment, in step S502, a follow-shot instruction is received in a case that reference video content is played on a video play interface. After a first video display region and a second video display region are displayed on a terminal screen in step S504, the video production method further includes the following step:

S5052: Receive an interface adjustment instruction, and adjust a display mode of a video display region according to the interface adjustment instruction. The video display region includes at least one of the first video display region and the second video display region, and the display mode includes at least one of a size and a location of the display region.

The interface adjustment instruction received by the terminal includes at least one of a first interface adjustment instruction and a second interface adjustment instruction. The first interface adjustment instruction is an instruction for a user to directly set the display mode, and the second interface adjustment instruction is an instruction for the user to indirectly set the display mode.

The first interface adjustment instruction may be an instruction for adjusting the display mode of the video display region after the user selects the video display region. The adjustment of the display mode includes adjustment of the location of the display region and adjustment of the size of the display region.

Taking the first video display region as an example, for the adjustment of the location of the display region, after selecting the first video display region, the user drags the first video display region for adjustment. A dragging mode is following dragging, that is, a location of the first video display region changes in real time with a change of a drag location, and the location of the first video display region changes a plurality of times, thereby adjusting the location of the first video display region. Further, the dragging mode may also be non-following dragging, that is, the location of the first video display region changes only from an initial location before the dragging to a final location after the dragging, and the location of the first video display region changes twice. When the location of the first video display region is changed, the first video display region may be shifted correspondingly according to a location offset between the final location after the dragging and the initial location before the dragging, or a center location of the first video display region is directly moved to the final location after the dragging. In addition, when non-following dragging is performed, the "final to-be-dragged final location" of the first video display region may be displayed in a dotted frame or other forms on the terminal screen, thereby facilitating the user to adjust and confirm the location.

For the adjustment of the size of the display region, the user may further select one or two borders in the first video region after selecting the first video display region, and send the interface adjustment instruction by dragging the border to adjust the size of the display region.

The second interface adjustment instruction may be preset adjustment on the video display region through a preset action. For example, after the user selects the first video display region and leaves the first video display region within a preset time, a display mode of the first video display region and a display mode of the second video display region may be instructed to be switched.

Based on the video production method in this implementation, the user can adjust the display mode of the video display region, and it is more convenient for the user to record videos, thereby further increasing user stickiness.

Referring to FIG. 5, in an embodiment, after the operation of displaying a first video display region and a second video display region on a terminal screen, the video production method further includes the following step:

S5051. Display at least one of an additional resource and resource information of the additional resource in the second video display region in a case that the reference video content includes the additional resource. The additional resource includes at least one of music, a widget, a special effect, and a topic.

When the additional resource is a displayable object such as a widget, a special effect, or a topic, the additional resource is displayed in the second video display region on the terminal screen. When the additional resource is a non-displayable object such as music, the resource information is displayed in the second video display region on the terminal screen. The resource information may be a name of the additional resource.

It is to be understood that the reference video content includes at least a video resource, and may further include the additional resource. The video resource is original video content that does not include any additional resource. The additional resource is an element for modifying the original video content, such as music, a widget, a special effect, or a topic. Information about the reference video content may be recorded in a piece of feed (a data format) information, and the feed information may include a link, a topic identifier, a music identifier, a widget identifier list, and the like of the video resource. A format of the video resource may be any video format, including but not limited to, H264 (a high-performance video codec technology).

The music is an audio file independent of the video resource, and a format of the audio file may include MP3, AAC, MP4, MOV, or the like. Additional resource information corresponding to the music may be a music name.

The widget may be a virtual decoration, such as a virtual wearable accessory such as a headwear, glasses, a hairstyle, clothing, a bag, a brooch, a scarf, or shoes, or a virtual non-wearable accessory such as the sun, the moon, a tree, or a beach. The widget may be an augmented reality (AR) widget. For example, whether there is a person in the real-time video content, and a location of the face and a rotation angle of the head may be identified through an algorithm, face data is correspondingly updated to a virtual head model hidden in a 3D scene and a visible widget associated with the virtual head model, and the 3D scene is converted into 2D content and drawn onto the real-time video content through model view matrix transformation corresponding to actual projection matrix transformation, so that an AR effect is achieved. The terminal may identify information about the location of the face and the rotation angle of the head through synchronous identification or asynchronous identification.

The special effect may be beautifying a character in a video, or performing specific setting on a background or scene in the video, for example, setting the background or scene to a form of preset picture content. The topic may be description information of the reference video content in a video community, such as a theme name, a keyword, and core content of the reference video content.

Based on the video recording method in this implementation, when the user is performing video follow-shot recording, there is no need to find or add the additional resource in the reference video content, thereby reducing the difficulty of follow-shot recording for the user and increasing user stickiness.

In an embodiment, the operation of displaying at least one of an additional resource and resource information of the additional resource in the second video display region in a case that the reference video content includes the additional resource may include: displaying the at least one of the additional resource and the resource information of the additional resource in the second video display region according to a resource identifier in an instruction for adding the same type of additional resource in a case that the reference video content includes the additional resource and the instruction for adding the same type of additional resource is received. The resource identifier includes resource identifiers of all additional resources in the reference video content. In this way, a function of adding all same additional resources to the reference video content may be implemented by using a simple instruction for adding the same type of additional resource, for example, the user touches a preset button. Therefore, the user can add the same type of additional resource as required, thereby further increasing user stickiness.

Further, the resource identifier in the instruction for adding the same type of additional resource may be a resource identifier of an additional resource preset in the reference video content. A list of all resources in the additional resources may be provided for the user to select, and an additional resource selected by the user is used as the preset additional resource. A plurality of selection schemes may be preset. The preset selection scheme may be a specified type of additional resource, such as adding all widgets in the additional resources as preset additional resources, or adding all special effects in the additional resources as preset resources. In this way, the user can independently choose to add some additional resources of the same type, so that diversity of the target video can be improved, thereby further increasing user stickiness.

Figure 6:
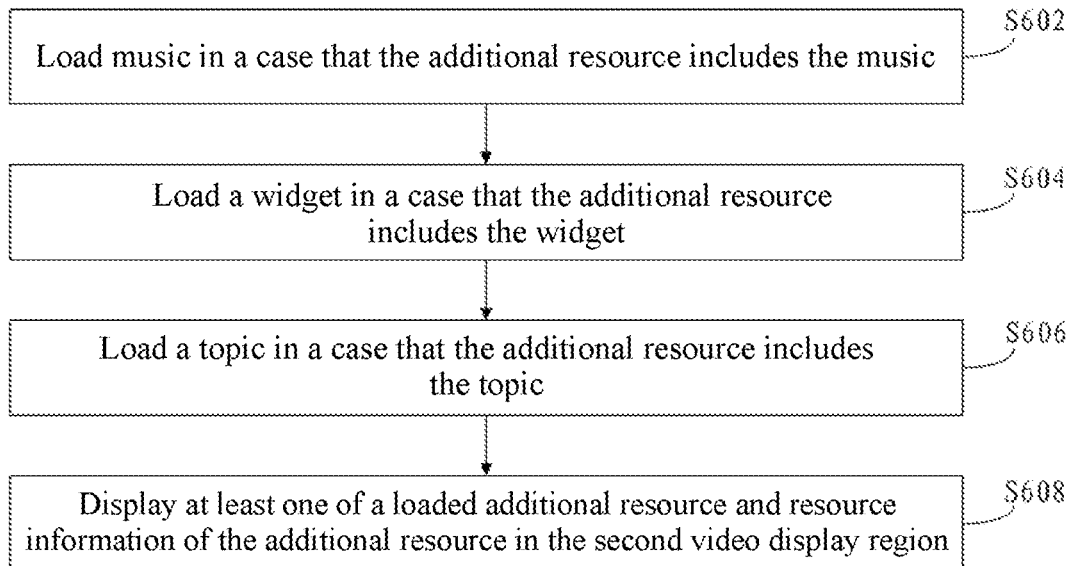
FIG. 6 is a schematic flowchart of a specific step of a video production method according to an embodiment.

As shown in FIG. 6, in an embodiment, the operation of displaying at least one of an additional resource and resource information of the additional resource in the second video display region in a case that the reference video content includes the additional resource includes the following steps:

S602. Load the music in a case that the additional resource includes the music.

S604. Load the widget in a case that the additional resource includes the widget.

S606. Load the topic in a case that the additional resource includes the topic.

S608. Display at least one of a loaded additional resource and resource information of the additional resource in the second video display region.

The loaded additional resource is an additional resource that is successfully loaded. Based on the video production method in this implementation, the terminal may display the at least one of the loaded additional resource and the resource information of the additional resource in the second video display region, and the terminal may skip an additional resource that fails to load and perform video recording according to the loaded additional resource.

Further, after the operation of displaying a first video display region and a second video display region on a terminal screen, the method further includes: loading audio of the video resource in the reference video content in a case that the additional resource does not include the music; and displaying audio information of the loaded audio in the second video display region. It is to be understood that, in a further embodiment, the reference video content includes the video resource and the additional resource, and the video resource includes the audio. When the additional resource does not include the music, resource information corresponding to the music is not displayed in the second video display region, for example, a music name. In this case, the audio information of the audio in the video resource is displayed.

It is to be understood that, in the embodiment in which the music is loaded in a case that the additional resource includes the music, further, the terminal may add the music when recording the displayed real-time video content in the second video display region. Alternatively, in the embodiment in which the audio of the video resource in the reference video content is loaded in a case that the additional resource does not include the music, further, the terminal may add the audio when recording the displayed real-time video content in the second video display region. In this way, the user can conveniently record a video without dubbing, thereby reducing the video recording difficulty for the user and further increasing user stickiness.

It is to be understood that, in other embodiments, when the additional resource includes the music, the terminal may add the music and add the audio of the video resource when recording the displayed real-time video content in the second video display region. In this way, music and audio content of the target video are consistent with the reference video content, thereby reducing the video recording difficulty for the user and further increasing user stickiness.

In an embodiment, the corresponding additional resource is downloaded before the at least one of the additional resource and the resource information of the additional resource is displayed in the second video display region. The terminal may download the additional resource through a hardware interface, including but not limited to, Wi-Fi, Bluetooth, cellular communication, and the like. The download of the additional resource may support or not support resumable data transfer. The corresponding additional resource is downloaded before the loaded additional resource is added, so that the loading process of the additional resource can be implemented locally without online loading, that is, there is no need to download data through networking and load data downloaded in real time into a memory of the terminal. In this way, smoothness of video recording can be improved, thereby further increasing user stickiness.

Further, before the terminal downloads the corresponding additional resource, the method may further include: determining whether the additional resource has been downloaded. If the additional resource has not been downloaded, the corresponding additional resource is downloaded, or if the additional resource has been downloaded, it is not necessary to download the corresponding accessory resource. That the additional resource has been downloaded means that the additional resource has been downloaded in the video production process, or the additional resource can be found locally. Correspondingly, that the additional resource has not been downloaded means that the additional resource has not been downloaded in the video production process, or the additional resource cannot be found locally. It is determined whether the additional resource can be found locally, to determine whether the additional resource has been downloaded, thereby avoiding repeated downloading, saving local resources, and improving video recording efficiency.

Further, the terminal displays a download progress when downloading the additional resource. The download progress is a progress of completion of the download of the additional resource. A display format of the download progress includes at least one of a progress bar and a percentage. In this way, it is convenient for the user to learn of a download status of the additional resource. In order to further facilitate the user to learn of the download status of the additional resource the terminal may further display a download stage when downloading the additional resource. The download stage refers to the currently downloaded additional resource. For example, the download stage may be music downloading, topic downloading, and widget downloading.

In an embodiment, before the operation of playing the reference video content in the first video display region, and recording the displayed real-time video content in the second video display region, the method further includes: downloading the video resource in the reference video content. In this way, smooth playing of the video resource in the reference video content is ensured to avoid impact on smoothness of the video recording process, thereby further increasing user stickiness.

In an embodiment, referring to FIG. 5, before the operation of playing the reference video content in the first video display region, and recording displayed real-time video content in the second video display region in step S506, the video production method further includes the following step:

S5055. Receive a resource adding instruction, and add a resource corresponding to a resource identifier in the resource adding instruction in the second display region, the resource including at least one of music, a widget, a special effect, a topic, and audio of a video resource.

The music, the widget, the special effect, the topic, and the audio of the video resource may be in the same form as the music, the widget, the special effect, the topic, and the audio of the video resource in the reference video content.

The terminal may receive the resource adding instruction by providing a resource list and in a form in which the user selects a resource in the resource list. The resource list may include at least one of the music, the widget, the special effect, the topic, and the audio of the video resource.

In this way, regardless of whether the reference video content includes the music, the widget, the special effect, the topic, and the audio of the video resource, the user can add resources as required to increase diversity of video recording, thereby further increasing user stickiness.

Figure 7:
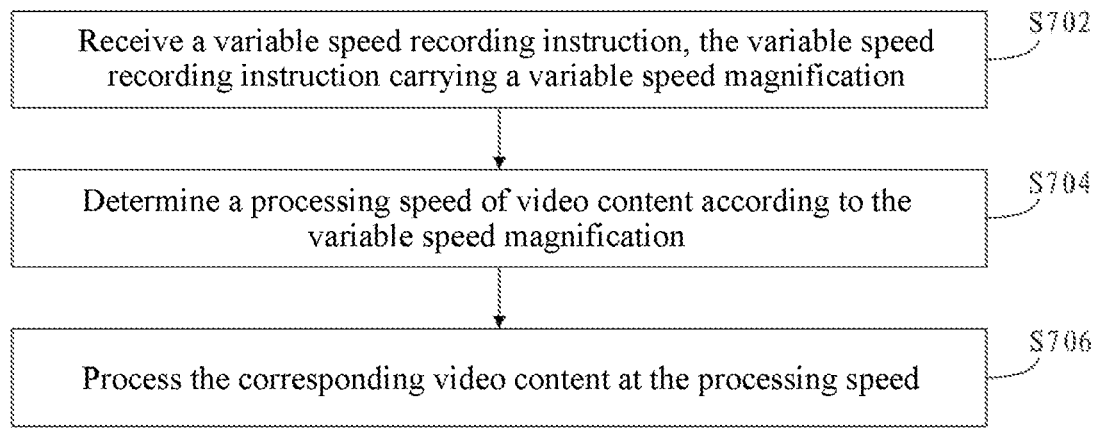
FIG. 7 is a schematic flowchart of a specific step of a video production method according to an embodiment.

Referring to FIG. 7, in an embodiment, the operation of playing the reference video content in the first video display region, and recording the displayed real-time video content in the second video display region includes the following steps:

S702. Receive a variable speed recording instruction, the variable speed recording instruction carrying a variable speed magnification.

S704. Determine a processing speed of video content according to the variable speed magnification, the video content including at least one of the reference video content and the real-time video content, and the processing speed including at least one of a play speed of the reference video content and a recording speed of the real-time video content.

S706. Process the corresponding video content at the processing speed, a processing process of the video content including at least one of recording the displayed real-time video content at the recording speed in the second video display region and playing the reference video content at the play speed in the first video display region.

This embodiment includes but is not limited to the following three manners:

(1) When the terminal determines the play speed of the reference video content according to the variable speed magnification, the reference video content is played at the play speed in the first video display region when the displayed real-time video content is recorded in the second video display region.

(2) When the terminal determines the recording speed of the real-time video content according to the variable speed magnification, the reference video content is played in the first video display region when the displayed real-time video content is recorded at the recording speed in the second video display region.

(3) When the terminal determines the play speed of the reference video content and the recording speed of the real-time video content according to the variable speed magnification, the reference video content is played at the play speed in the first video display region when the displayed real-time video content is recorded at the recording speed in the second video display region.

A manner in which the terminal determines at least one of the play speed and the recording speed may be: a reciprocal of the variable speed magnification is used as the play speed and the variable speed magnification is used as the recording speed or the variable speed magnification is used as the play speed and a reciprocal of the variable speed magnification is used as the recording speed. Other transformations may be made on the basis of the variable speed magnification, for example, the variable speed magnification is multiplied by a factor to obtain at least one of the play speed and the recording speed.

The variable speed magnification includes but is not limited to 0.4 times, 0.5 times, 1 times, 2 times, 2.5 times, or the like. The foregoing manner (1) in which the variable speed magnification is 2 times is described as an example. When the user selects 2× speed recording, the variable speed magnification carried in the variable speed recording instruction received by the terminal is 2 times, and the play speed of the reference video content is determined to be $\frac{1}{2}$=0.5 times according to the variable speed magnification. In this embodiment, actual recording is still performed at a normal speed. When the displayed real-time video content is recorded in the second video display region, the reference video content is played at the play speed of 0.5 times in the first video display region. When the target video is generated based on the recorded real-time video content and the reference video content, synthesis is performed at the variable speed magnification, namely, 2× speed, to generate the target video. In this case, a video recording speed is doubled, and corresponding audio is returned to the normal speed.

In an embodiment, there are at least two reference video identifiers. This embodiment includes the following two manners:

(1) Reference video content respectively corresponding to the at least two reference video identifiers may be played in the first video display region in a preset order, and the preset order may be a play order set by the user.

The operation of playing the reference video content in the first video display region, and recording the displayed real-time video content in the second video display region includes: playing, by the terminal, reference video content corresponding to all of the reference video identifiers in the first video display region in a preset order during the recording of the displayed real-time video content in the second video display region, the reference video content corresponding to each of the reference video identifiers being corresponding to one target segment in the target video.

Therefore, the user can perform performance based on different reference video contents in stages, and record the target video. In this way, diversity of video recording is increased, thereby further increasing user stickiness.

(2) Reference video content respectively corresponding to the at least two reference video identifiers may be played in at least two first video display regions, respectively. That is, a number of first video display regions in the terminal screen is the same as a number of reference video identifiers, and reference video content of one reference video identifier is correspondingly played in each first video display region. Therefore, the user can simultaneously perform based on at least two pieces of reference video contents, and record the target video, so that diversity of video recording is increased, thereby further increasing user stickiness.

Figure 8:
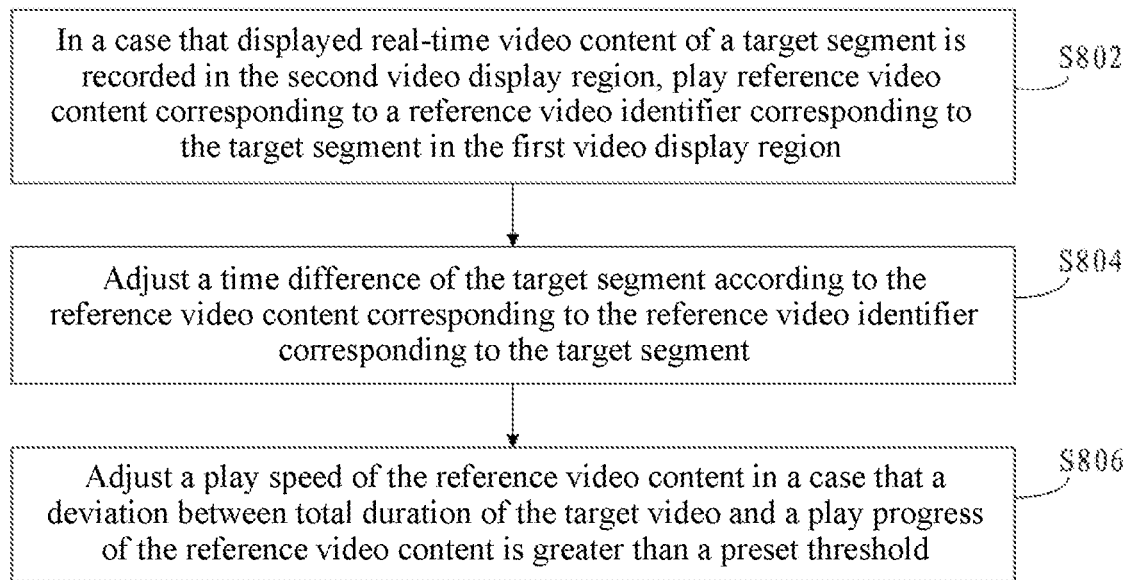
FIG. 8 is a schematic flowchart of a specific step of a video production method according to an embodiment.

Further, as shown in FIG. 8, the operation of playing reference video content corresponding to all of the reference video identifiers in the first video display region in a preset order during the recording of the displayed real-time video content in the second video display region includes the following steps:

S802. In a case that the displayed real-time video content of the target segment is recorded in the second video display region, play the reference video content corresponding to the reference video identifier corresponding to the target segment in the first video display region.

S804. Adjust a time difference of the target segment according to the reference video content corresponding to the reference video identifier corresponding to the target segment.

The time difference adjustment may be a corresponding adjustment on a time difference between an important time point in the target segment and an important time point in the reference video content. The important time point may be an evenly set time point or a time point set according to importance of content. In this way, the terminal adjusts a time difference of each target segment, so that the time difference of each target segment can be prevented from becoming larger, thereby further increasing user stickiness.

Still further, the operation of playing reference video content corresponding to all of the reference video identifiers in the first video display region in a preset order during the recording of the displayed real-time video content in the second video display region may further include the following step:

S806. Adjust the play speed of the reference video content in a case that a deviation between total duration of the target video and a play progress of the reference video content is greater than a preset threshold. In this way, the deviation reaches an acceptable range, that is, does not exceed the preset threshold. The play progress of the reference video content includes a play progress of the video resource in the reference video content and a play progress of music in the additional resource in the reference video content.

In an embodiment, referring to FIG. 5, the operation of generating a target video based on the recorded real-time video content and the reference video content includes the following step:

S508. Synthesize an image of the recorded real-time video content with preset audio according to a preset video synthesis strategy to generate the target video.

When recording real-time video content, or after recording real-time video content, the terminal may synthesize the image of the recorded real-time video content with the preset audio according to the preset video synthesis strategy to generate the target video.

The preset video synthesis strategy may be a user-set or default video synthesis strategy. The preset video synthesis strategy may include the following four video synthesis strategies: (1) Synthesize the image of the real-time video content with audio of the real-time video content; (2) Synthesize the image of the real-time video content with audio of the reference video content; (3) Synthesize the image of the real-time video content with audio of the video resource in the reference video content; (4) Synthesize the image of the real-time video content with music in the reference video content. It is to be understood that, the audio of the reference video content includes the audio of the video resource in the reference video content and the music in the additional resource in the reference video content. In the manner of synthesizing the image of the real-time video content with the audio of the real-time video content, a sound of the reference video content may be collected by using an audio collecting apparatus as audio of the target video, or the audio of the video resource in the reference video content may be directly used as audio of the target video.

In this way, the terminal may synthesize the image of the real-time video content with the preset audio according to the preset video synthesis strategy. Especially in the implementation in which the video synthesis strategy is set by the user, the user can selectively set synthesized content of audio and image in the target video as required. Therefore, user stickiness can be further increased.

In an embodiment, at least one of a volume of the audio of the real-time video content and a volume of the music may be adjusted by receiving a volume setting instruction. For example, the volume of the music is adjusted to increase the volume of the audio. In this way, the user can personalize at least one of a volume of music and a volume of audio in the target video to increase diversity of the target video, thereby further increasing user stickiness.

Referring to FIG. 5, in an embodiment, after the operation of generating a target video based on the recorded real-time video content and the reference video content, the video production method further includes:

S509. Receive a video editing instruction, and edit the target video according to the video editing instruction.

The video editing instruction is an instruction for editing a video. Editing may include functions such as a special effect, graffiti, a sticker, music, and a filter. Based on the video production method in this implementation, the user can further edit the target video through an editing function to achieve the user's desired effect. Therefore, user stickiness is further increased.

Referring to FIG. 5, in an embodiment, after the operation of generating a target video based on the recorded real-time video content and the reference video content, the video production method further includes:

S510. Receive a video releasing instruction, and release the target video according to the video releasing instruction.

The video releasing instruction may be an instruction for releasing the target video to a preset platform (such as a video community). After the target video is released, the target video may also be played by other terminals or used by other users as the reference video content to perform, thus forming a virtuous circle and continuously driving more ordinary users to participate in creation. In this way, the target video can be spread through a relationship chain to drive more people around to produce videos together. Therefore, user stickiness is further increased.

Figure 9:
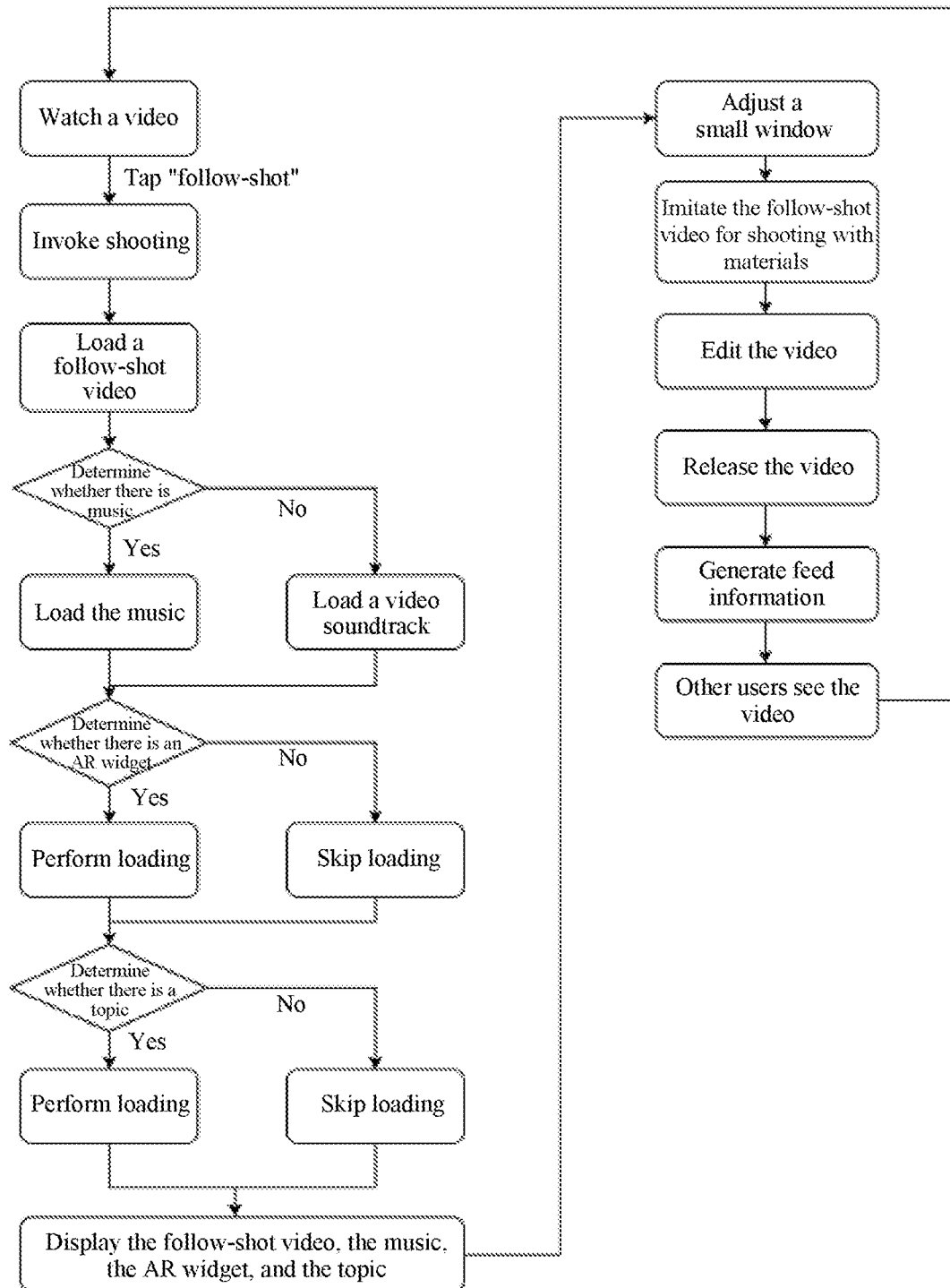
FIG. 9 is a process diagram of video production according to a specific embodiment.
Figure 10:
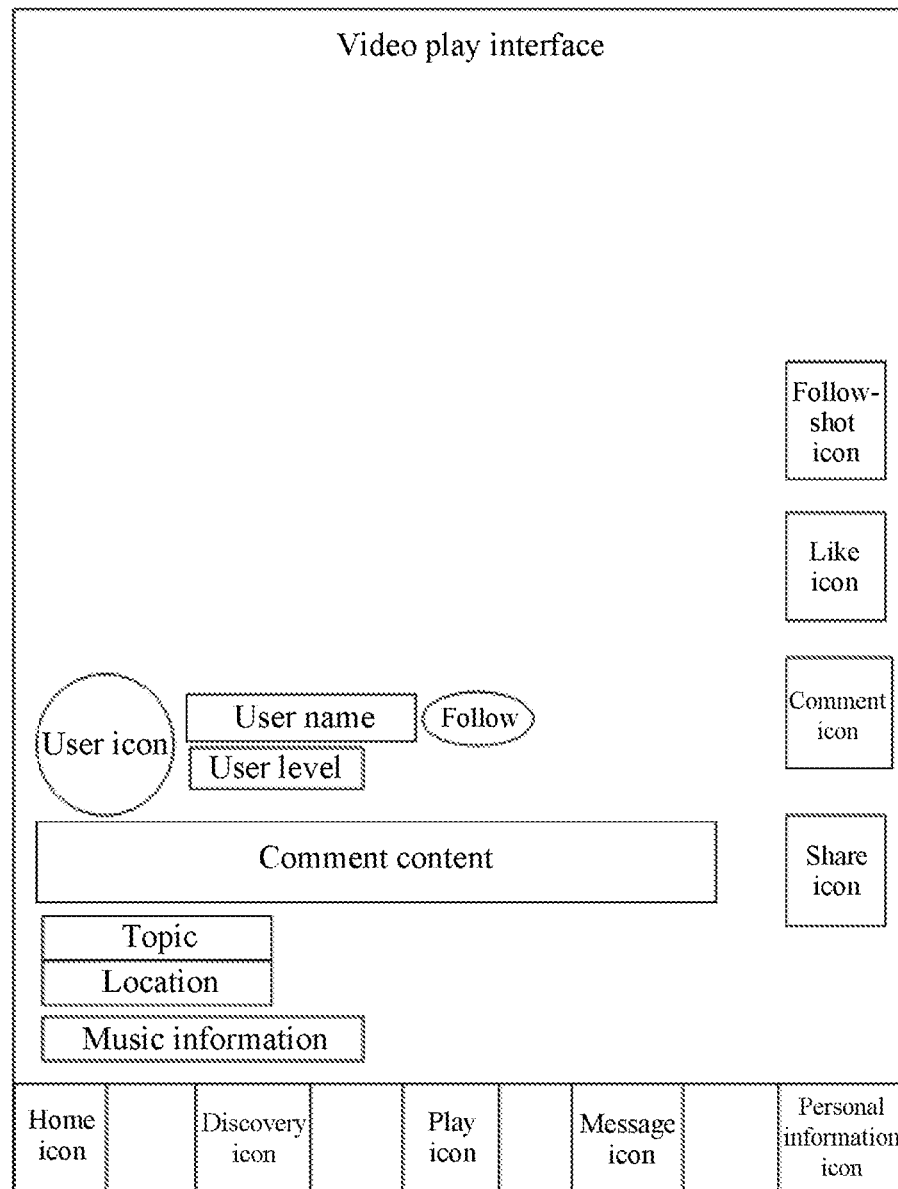
FIG. 10 is a schematic diagram of a video play interface according to an embodiment.

The following describes a video production process by using a specific application example. FIG. 9 is a schematic flowchart in which a user watches a video, produces a video, and releases a video through a terminal. FIG. 10 is a diagram of a video play interface of a user terminal. The user can watch a video in a video community by tapping a "follow-shot icon" in the video play interface shown in FIG. 10, to invoke shooting, that is, when playing reference video content in the video play interface, the terminal receives a follow-shot instruction by tapping the "follow-shot" button on the video play interface, and displays a first video display region and a second video display region on a follow-shot interface on a terminal screen. The first video display region is within a display range of the second video display region, and the first video display region is suspended on the second video display region. The terminal loads a video resource in the reference video content (that is, a follow-shot video). When an additional resource in the reference video content includes music, the terminal loads the music; otherwise, the terminal loads audio of the video resource. When the additional resource in the reference video content includes an AR widget, the terminal loads the AR widget; otherwise, the terminal does not load the AR widget. When the additional resource in the reference video content includes a topic, the terminal loads the topic; otherwise, the terminal does not load the topic. The terminal displays at least one of the loaded additional resource and resource information of the additional resource in the second video display region. The terminal receives an interface adjustment instruction, and adjusts a display mode of the first video display region according to the interface adjustment instruction (that is, adjusts a small window). Then, the user performs an imitation performance based on the reference video content. The terminal plays the reference video content in the first video display region, and records displayed real-time video content in the second video display region (that is, imitating the follow-shot video for shooting with materials). The terminal receives a video editing instruction, and edits a target video according to the video editing instruction. The terminal receives a video releasing instruction, and releases the target video according to the video releasing instruction. The target video may be used as new reference video content (in a form of generating feed information), and may be viewed by other users and used for creating a new target video.

It is to be understood that although the steps in the flowcharts of FIG. 2, FIG. 3, and FIG. 5 to FIG. 9 are sequentially displayed in accordance with instructions of arrows, these steps are not necessarily performed sequentially in the order indicated by the arrows. Unless clearly specified in this specification, execution of these steps is not strictly limited, and these steps may be performed in other orders. Moreover, at least some of the steps in FIG. 2, FIG. 3, and FIG. 5 to FIG. 9 may include a plurality of sub-steps or a plurality of stages. These sub-steps or stages are not necessarily performed at the same moment, but may be performed at different times. These sub-steps or stages are not necessarily executed sequentially, but may be performed with at least one part of the other steps or sub-steps of other steps or stages in turn.

Figure 11:
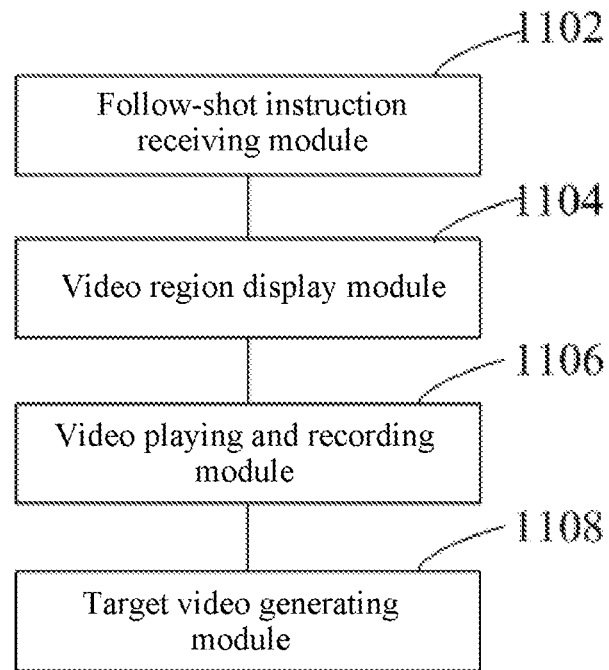
FIG. 11 is a structural block diagram of a video production apparatus according to an embodiment.

In an embodiment, as shown in FIG. 11, a video production apparatus is provided, including:

a follow-shot instruction receiving module 1102 configured to receive a follow-shot instruction in a case that reference video content is played on a video play interface, the follow-shot instruction including a reference video identifier;

a video region display module 1104 configured to display a first video display region and a second video display region on a terminal screen, the first video display region being used for displaying the reference video content corresponding to the reference video identifier, and the second video display region being used for displaying real-time video content acquired by a terminal camera apparatus;

a video playing and recording module 1106 configured to play the reference video content in the first video display region, and record the displayed real-time video content in the second video display region; and a target video generating module 1108 configured to generate a target video based on the recorded real-time video content and the reference video content.

According to the video production apparatus, the follow-shot instruction is received in a case that the reference video content is played on the video play interface, the follow-shot instruction including the reference video identifier; the first video display region and the second video display region are displayed on the terminal screen, the first video display region being used for displaying the reference video content corresponding to the reference video identifier, and the second video display region being used for displaying the real-time video content acquired by the terminal camera apparatus; the reference video content is played in the first video display region, and the displayed real-time video content is recorded in the second video display region; and the target video is generated based on the recorded real-time video content and the reference video content. The first video display region and the second video display region are displayed on the terminal screen, the reference video content is played in the first video display region, and the displayed real-time video content is recorded in the second video display region, so that when a user records a video, the user can perform based on the reference video content, thereby reducing the recording difficulty for the user and increasing user stickiness.

In an embodiment, the follow-shot instruction receiving module is configured to receive the follow-shot instruction in a case that the reference video content is played on the video play interface.

In an embodiment, the follow-shot instruction receiving module includes: an instruction setting unit configured to receive a follow-shot starting point setting instruction in a case that the reference video content is played on the video play interface, the follow-shot starting point setting instruction carrying follow-shot starting point information; and an instruction generating unit configured to generate the follow-shot instruction according to the follow-shot starting point setting instruction, the follow-shot instruction further including the follow-shot starting point information.

In an embodiment, the follow-shot instruction receiving module includes: an instruction setting unit configured to receive a follow-shot ending point setting instruction in a case that the reference video content is played on the video play interface, the follow-shot ending point setting instruction carrying follow-shot ending point information; and an instruction generating unit configured to generate the follow-shot instruction according to the follow-shot ending point setting instruction, the follow-shot instruction further including the follow-shot ending point information.

In an embodiment, the follow-shot instruction receiving module is configured to receive the follow-shot instruction by receiving a preset operation on the video play interface in a case that the reference video content is played on the video play interface.

In an embodiment, the first video display region is within a display range of the second video display region, and the first video display region is suspended on the second video display region.

In an embodiment, an overlapping area of the first video display region and the second video display region does not exceed a preset threshold, the preset threshold being a non-negative number.

In an embodiment, the apparatus further includes: an interface instruction receiving module configured to receive an interface adjustment instruction, and adjust a display mode of the first video display region according to the interface adjustment instruction, the display mode including a size of the first video display region.

In an embodiment, the apparatus further includes: an interface instruction receiving module configured to receive an interface adjustment instruction, and adjust a display mode of the first video display region according to the interface adjustment instruction, the display mode including a location of the first video display region.

In an embodiment, the apparatus further includes: an interface instruction receiving module configured to receive an interface adjustment instruction, and adjust a display mode of the second video display region according to the interface adjustment instruction, the display mode including a size of the second video display region.

In an embodiment, the apparatus further includes: an interface instruction receiving module configured to receive an interface adjustment instruction, and adjust a display mode of the second video display region according to the interface adjustment instruction, the display mode including a location of the second video display region.

In an embodiment, the apparatus further includes: an additional resource display module configured to display an additional resource in the second video display region in a case that the reference video content includes the additional resource, the additional resource including at least one of music, a widget, a special effect, and a topic.

In an embodiment, the apparatus further includes: an additional resource display module configured to display resource information of an additional resource in the second video display region in a case that the reference video content includes the additional resource, the additional resource including at least one of music, a widget, a special effect, and a topic.

In an embodiment, the additional resource display module includes: a music loading unit configured to load the music in a case that the additional resource includes the music; a widget loading unit configured to load the widget in a case that the additional resource includes the widget; a topic loading unit configured to load the topic in a case that the additional resource includes the topic; and a resource display unit configured to display the loaded additional resource in the second video display region.

In an embodiment, the additional resource display module includes: a music loading unit configured to load the music in a case that the additional resource includes the music; a widget loading unit configured to load the widget in a case that the additional resource includes the widget; a topic loading unit configured to load the topic in a case that the additional resource includes the topic; and a resource display unit configured to display the resource information of the loaded additional resource in the second video display region.

In an embodiment, the reference video content includes a video resource and the additional resource, and the apparatus further includes: a resource audio loading module configured to load audio of the video resource in the reference video content in a case that the additional resource does not include the music; and an audio information display module configured to display audio information of the loaded audio in the second video display region.

In an embodiment, the apparatus further includes: an additional resource downloading module configured to download the corresponding additional resource before the additional resource display module displays the additional resource in the second video display region.

In an embodiment, the apparatus further includes: an additional resource downloading module configured to download the corresponding additional resource before the additional resource display module displays the resource information of the additional resource in the second video display region.

In an embodiment, the additional resource display module is further configured to display the additional resource in the second video display region according to a resource identifier in an instruction for adding the same type of additional resource in a case that the reference video content includes the additional resource and the instruction for adding the same type of additional resource is received.

In an embodiment, the additional resource display module is further configured to display the resource information in the second video display region according to a resource identifier in an instruction for adding the same type of additional resource in a case that the reference video content includes the additional resource and the instruction for adding the same type of additional resource is received.

In an embodiment, the resource identifier in the instruction for adding the same type of additional resource includes a resource identifier of an additional resource preset in the reference video content.

In an embodiment, the apparatus further includes: a resource adding module configured to receive a resource adding instruction, and add a resource corresponding to a resource identifier in the resource adding instruction in the second display region, the resource including at least one of music, a widget, a special effect, a topic, and audio of a video resource.

In an embodiment, the video playing and recording module includes: a variable speed instruction receiving unit configured to receive a variable speed recording instruction, the variable speed recording instruction carrying a variable speed magnification; a speed determining unit configured to determine a play speed of the reference video content according to the variable speed magnification; and a video playing unit configured to play the reference video content at the play speed in the first video display region.

In an embodiment, the video playing and recording module includes: a variable speed instruction receiving unit configured to receive a variable speed recording instruction, the variable speed recording instruction carrying a variable speed magnification; a speed determining unit configured to determine a recording speed of the real-time video content according to the variable speed magnification; and a video recording unit configured to record the displayed real-time video content at the recording speed in the second video display region.

In an embodiment, there are at least two reference video identifiers.

In an embodiment, the video playing and recording module is configured to play reference video content corresponding to all of the reference video identifiers in the first video display region in a preset order during the recording of the displayed real-time video content in the second video display region, the reference video content corresponding to each of the reference video identifiers being corresponding to one target segment in the target video.

In an embodiment, the video playing and recording module includes: a target segment recording unit configured to: in a case that the displayed real-time video content of the target segment is recorded in the second video display region, play the reference video content corresponding to the reference video identifier corresponding to the target segment in the first video display region; and a target segment adjusting unit configured to adjust a time difference of the target segment according to the reference video content corresponding to the reference video identifier corresponding to the target segment.

In an embodiment, the target video generating module is configured to synthesize an image of the recorded real-time video content with preset audio according to a preset video synthesis strategy to generate the target video.

In an embodiment, the apparatus further includes: a video editing module configured to receive a video editing instruction, and edit the target video according to the video editing instruction.

In an embodiment, the apparatus further includes: a video releasing module configured to receive a video releasing instruction, and release the target video according to the video releasing instruction.

For a specific limitation on the video production apparatus, refer to the limitation on the video production method above. Details are not described herein again. Each module in the video production apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 12. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and computer programs in the non-volatile storage medium. The network interface of the computer device is configured to communicate with an external server through a network connection. The computer program is executed by the processor to implement a video production method.

Figure 12:
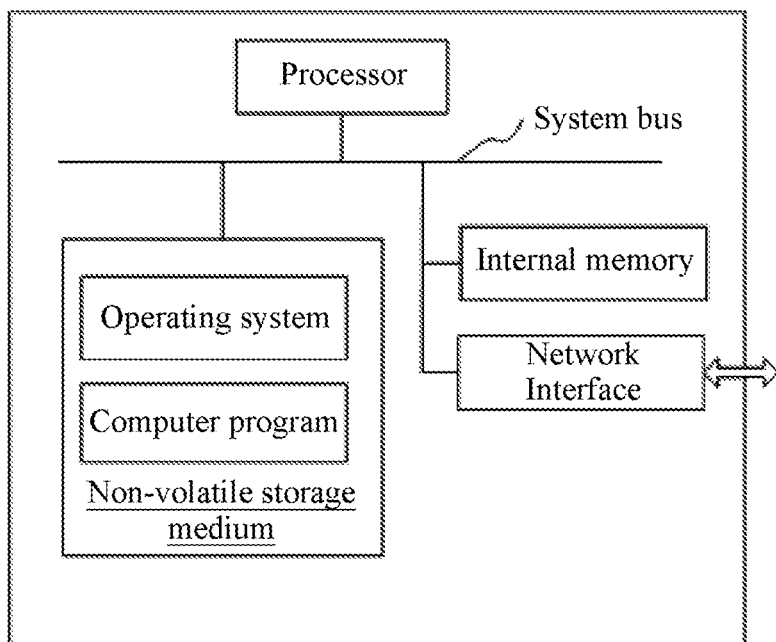
FIG. 12 is an internal structure diagram of a computer device according to an embodiment.

A person skilled in the art may understand that the structure shown in FIG. 12 is merely a block diagram of a part of the structure related to the solution of this application, and does not constitute a limitation on a computer device to which the solution of this application is applied. In particular, the computer device may include more or fewer components than those shown in the figure, or combine some components, or have different component arrangements.

In an embodiment, a computer device is provided, including a memory and a processor, the memory storing a computer program, when executed by the processor, causing the processor to perform the steps of the video production method in any one of the foregoing embodiments.

In an embodiment, a computer readable storage medium is provided, storing a computer program, when executed by a processor, causing the processor to perform the steps of the video production method in any one of the foregoing embodiments.

A person of ordinary skill in the art may understand that all or some of the processes of the methods in the foregoing embodiments may be implemented by a computer program instructing relevant hardware. The computer program may be stored in a non-volatile computer readable storage medium, and may include, for example, processes of the embodiments of the foregoing methods when executed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RANI is available in a variety of forms, such as a static RANI (SRAM), a dynamic RANI (DRANI), a synchronous DRANI (SDRAM), a dual data rate SDRAM (DDRSDRAM), an enhanced SDRANI (ESDRANI), a synchronization link (Synchlink) DRANI (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be randomly combined. For concise description, not all possible combinations of the technical features in the embodiment are described. However, all the combinations of the technical features are to be considered as falling within the scope described in this specification provided that they do not conflict with each other.

The foregoing embodiments only describe several implementations of this application, which are described specifically and in detail, and therefore cannot be construed as a limitation to the patent scope of this application. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A video production method, performed by a terminal device, the method comprising:
   receiving a follow-shot instruction in a case that reference video content is played on a video play interface, the follow-shot instruction comprising a reference video identifier;
   simultaneously displaying a first video display region and a second video display region on a terminal screen, the first video display region being used for displaying the reference video content corresponding to the reference video identifier, and the second video display region being used for displaying real-time video content acquired by a terminal camera apparatus;
   during simultaneous display of the first video display region and the second display region on the terminal screen, displaying an additional resource or resource information of the additional resource in the second video display region dependent on the reference video content to be displayed in the first video display region comprising the additional resource, the additional resource comprising at least one of music, a widget, a special effect, or a topic;
   playing the reference video content in the first video display region, and recording the displayed real-time video content in the second video display region; and
   generating a target video based on the recorded real-time video content and the reference video content.

2. The method according to claim 1, wherein receiving a follow-shot instruction in a case that reference video content is played on a video play interface comprises:
   receiving a follow-shot starting point setting instruction in a case that the reference video content is played on the video play interface, the follow-shot starting point setting instruction carrying follow-shot starting point information; and
   generating the follow-shot instruction according to the follow-shot starting point setting instruction, the follow-shot instruction further comprising the follow-shot starting point information.

3. The method according to claim 1, wherein receiving a follow-shot instruction in a case that reference video content is played on a video play interface comprises:
   receiving a follow-shot ending point setting instruction in a case that the reference video content is played on the video play interface, the follow-shot ending point setting instruction carrying follow-shot ending point information; and
   generating the follow-shot instruction according to the follow-shot ending point setting instruction, the follow-shot instruction further comprising the follow-shot ending point information.

4. The method according to claim 1, wherein receiving a follow-shot instruction in a case that reference video content is played on a video play interface comprises:
   receiving the follow-shot instruction by receiving a preset operation on the video play interface in a case that the reference video content is played on the video play interface.

5. The method according to claim 1, wherein at least one of:
   the first video display region is within a display range of the second video display region, and the first video display region is suspended on the second video display region, or
   an overlapping area of the first video display region and the second video display region does not exceed a preset threshold, the preset threshold being a non-negative number.

6. The method according to claim 1, wherein after displaying a first video display region and a second video display region on a terminal screen, the method further comprises:
   receiving an interface adjustment instruction, and adjusting a display mode of the first video display region according to the interface adjustment instruction, the display mode comprising a size of the first video display region, a location of the first video display region, a size of the second video display region, or a location of the second video display region.

7. The method according to claim 1, wherein displaying an additional resource or resource information of the additional resource in the second video display region in a case that the reference video content comprises the additional resource comprises:
   loading the music in a case that the additional resource comprises the music;
   loading the widget in a case that the additional resource comprises the widget;
   loading the topic in a case that the additional resource comprises the topic; and
   displaying the loaded additional resource or the resource information of the loaded additional resource in the second video display region.

8. The method according to claim 7, wherein the reference video content comprises a video resource and the additional resource, and after the operation of displaying a first video display region and a second video display region on a terminal screen, the method further comprises:
   loading audio of the video resource in the reference video content in a case that the additional resource does not comprise the music; and displaying audio information of the loaded audio in the second video display region.

9. The method according to claim 1, comprising: downloading the corresponding additional resource before the displaying of the additional resource or the resource in the additional resource in the second video display region.

10. The method according to claim 1, wherein the operation of displaying an additional resource or resource information of the additional resource in the second video display region in a case that the reference video content comprises the additional resource comprises:
displaying the additional resource or the resource information of the additional resource in the second video display region according to a resource identifier in an instruction for adding the same type of additional resource in a case that the reference video content comprises the additional resource and the instruction for adding the same type of additional resource is received.

11. The method according to claim 10, wherein the resource identifier in the instruction for adding the same type of additional resource comprises a resource identifier of an additional resource preset in the reference video content.

12. The method according to claim 1, wherein before playing the reference video content in the first video display region, and recording the displayed real-time video content in the second video display region, the method further comprises:
receiving a resource adding instruction, and adding a resource corresponding to a resource identifier in the resource adding instruction in the second display region, the resource comprising at least one of music, a widget, a special effect, a topic, and audio of a video resource.

13. The method according to claim 1, wherein playing the reference video content in the first video display region, and recording the displayed real-time video content in the second video display region comprises:
receiving a variable speed recording instruction, the variable speed recording instruction carrying a variable speed magnification;
determining, according to the variable speed magnification, a play speed of the reference video content or a recording speed of the real-time video content; and
playing the reference video content at the play speed in the first video display region or the displayed real-time video content at the recording speed in the second video display region.

14. The method according to claim 1, wherein playing the reference video content in the first video display region, and recording the displayed real-time video content in the second video display region comprises:
playing reference video content corresponding to all reference video identifiers in the first video display region in a preset order during the recording of the displayed real-time video content in the second video display region, the reference video content corresponding to each of the reference video identifiers being corresponding to one target segment in the target video.

15. The method according to claim 14, wherein the operation of playing reference video content corresponding to all of the reference video identifiers in the first video display region in a preset order during the recording of the displayed real-time video content in the second video display region comprises:
in a case that the displayed real-time video content of the target segment is recorded in the second video display region, playing the reference video content corresponding to the reference video identifier corresponding to the target segment in the first video display region; and
adjusting a time difference of the target segment according to the reference video content corresponding to the reference video identifier corresponding to the target segment.

16. The method according to claim 1, wherein generating a target video based on the recorded real-time video content and the reference video content comprises:
synthesizing an image of the recorded real-time video content with preset audio according to a preset video synthesis strategy to generate the target video.

17. The method according to claim 1, after generating a target video based on the recorded real-time video content and the reference video content, further comprising at least one of:
receiving a video editing instruction, and editing the target video according to the video editing instruction, or
receiving a video releasing instruction, and releasing the target video according to the video releasing instruction.

18. A computer device, comprising:
a memory; and
a processor coupled to the processor, the processor configured to:
receive a follow-shot instruction in a case that reference video content is played on a video play interface, the follow-shot instruction comprising a reference video identifier;
simultaneously display a first video display region and a second video display region on a terminal screen, the first video display region being used for displaying the reference video content corresponding to the reference video identifier, and the second video display region being used for displaying real-time video content acquired by a terminal camera apparatus;
during simultaneous display of the first video display region and the second display region on the terminal screen, display an additional resource or resource information of the additional resource in the second video display region dependent on the reference video content to be displayed in the first video display region comprising the additional resource, the additional resource comprising at least one of music, a widget, a special effect, or a topic;
play the reference video content in the first video display region, and record the displayed real-time video content in the second video display region; and
generate a target video based on the recorded real-time video content and the reference video content.

19. A non-transitory computer-readable storage medium, storing at least one instruction, at least one program, and a code set or an instruction set, the at least one instruction, the at least one program, and the code set or the instruction set being loaded and executed by a processor to:
receive a follow-shot instruction in a case that reference video content is played on a video play interface, the follow-shot instruction comprising a reference video identifier;
simultaneously display a first video display region and a second video display region on a terminal screen, the first video display region being used for displaying the reference video content corresponding to the reference video identifier, and the second video display region being used for displaying real-time video content acquired by a terminal camera apparatus;

during simultaneous display of the first video display region and the second display region on the terminal screen, display an additional resource or resource information of the additional resource in the second video display region dependent on the reference video content to be displayed in the first video display region comprising the additional resource, the additional resource comprising at least one of music, a widget, a special effect, or a topic;

play the reference video content in the first video display region, and record the displayed real-time video content in the second video display region; and generate a target video based on the recorded real-time video content and the reference video content.

* * * * *